United States Patent
Cui et al.

(10) Patent No.: US 12,545,810 B2
(45) Date of Patent: Feb. 10, 2026

(54) MAGNETIC POLISHING SLURRY AND METHOD FOR POLISHING A WORKPIECE

(71) Applicant: TAIWAN SEMICONDUCTOR MANUFACTURING COMPANY LTD., Hsinchu (TW)

(72) Inventors: Ji Cui, Bolingbrook, IL (US); Chih Hung Chen, Hsinchu (TW); Kei-Wei Chen, Tainan (TW)

(73) Assignee: TAIWAN SEMICONDUCTOR MANUFACTURING COMPANY LTD., Hsinchu (TW)

( * ) Notice: Subject to any disclaimer, the term of this patent is extended or adjusted under 35 U.S.C. 154(b) by 162 days.

(21) Appl. No.: 17/141,948

(22) Filed: Jan. 5, 2021

(65) Prior Publication Data
US 2021/0348027 A1 Nov. 11, 2021

Related U.S. Application Data

(60) Provisional application No. 63/020,834, filed on May 6, 2020.

(51) Int. Cl.
*C09G 1/02* (2006.01)
*B24B 1/00* (2006.01)
*C09K 3/14* (2006.01)
*H01F 1/053* (2006.01)

(52) U.S. Cl.
CPC ............ *C09G 1/02* (2013.01); *B24B 1/005* (2013.01); *C09K 3/1454* (2013.01); *H01F 1/053* (2013.01)

(58) Field of Classification Search
CPC .................. C09G 1/02; H01F 1/053
See application file for complete search history.

(56) References Cited

U.S. PATENT DOCUMENTS

| 4,992,190 A * | 2/1991 | Shtarkman | H01F 1/447 252/78.3 |
| 5,645,752 A * | 7/1997 | Weiss | H01F 1/447 252/503 |
| 6,726,534 B1 * | 4/2004 | Bogush | B24B 37/0056 451/63 |
| 2003/0082998 A1 * | 5/2003 | Carter | C09K 3/1463 451/36 |
| 2006/0226126 A1 * | 10/2006 | Zhou | C11D 1/008 438/692 |

(Continued)

FOREIGN PATENT DOCUMENTS

WO  WO-0068332 A1 * 11/2000 ............ B24B 1/005
WO  WO-2009077412 A2 * 6/2009 ............ B82Y 30/00

OTHER PUBLICATIONS

Kwon, S.H. Choi H.J. Lee J.W. Hong K.P Myeong W.C. "Magnetorheology of Xanthan-gum-coated Soft Magnetic Carbonyl Iron Microspheres and Their Polishing Characteristics". Journal of the Korean Physical Society, vol. 62, No. 12, Jun. 2013, pp. 2118-2122. DOI: 10.3938/jkps.62.2118 (Year: 2013).*

(Continued)

*Primary Examiner* — Alexandra M Moore
(74) *Attorney, Agent, or Firm* — WPAT LAW; Anthony King

(57) ABSTRACT

A magnetic polishing slurry for polishing a workpiece includes magnetic particles coated with a modifying material, a liquid carrier, and abrasives. The modifying material has a hardness lower than that of the workpiece.

20 Claims, 14 Drawing Sheets

(56) References Cited

U.S. PATENT DOCUMENTS

2007/0117394 A1* 5/2007 Shinoda ............ H01L 21/32125
438/692
2014/0020305 A1* 1/2014 Kordonski ............... C09G 1/02
51/307

OTHER PUBLICATIONS

M. S. Cho, S. T. Lim, I. B. Jang, H. J. Choi and M. S. Jhon, "Encapsulation of spherical iron-particle with PMMA and its magnetorheological particles," in IEEE Transactions on Magnetics, vol. 40, No. 4, pp. 3036-3038, Jul. 2004, doi: 10.1109/TMAG.2004.830413. (Year: 2004).*

Hyo Seung Jung, Seung Hyuk Kwon, Hyoung Jin Choi, Jae Heum Jung, Young Gil Kim, Magnetic carbonyl iron/natural rubber composite elastomer and its magnetorheology, Composite Structures, vol. 136, 2016, pp. 106-112, ISSN 0263-8223, https://doi.org/10.1016/j.compstruct.2015.10.008. (Year: 2016).*

B.J. Park F.F. Fang and H.J. Choi Magnetorheology: materials and application Soft Matter 6, 5246 (2010) (Year: 2010).*

* cited by examiner

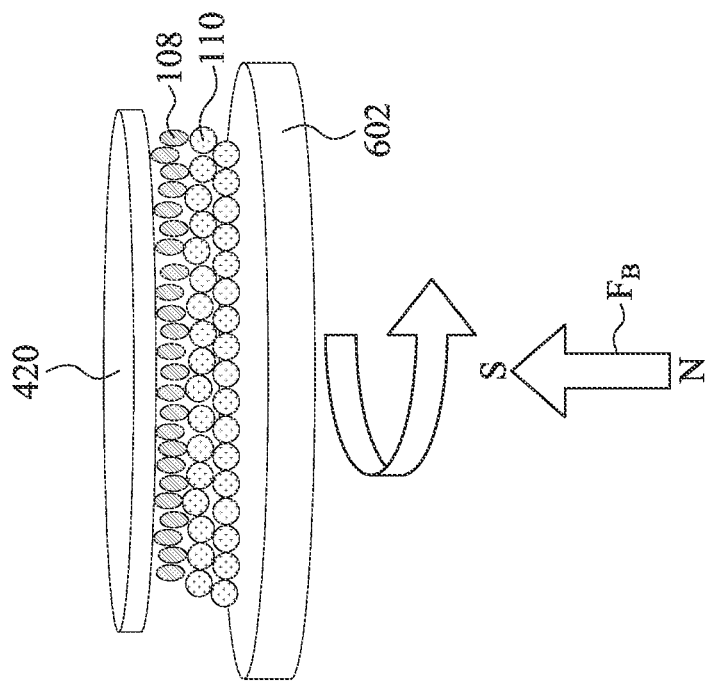
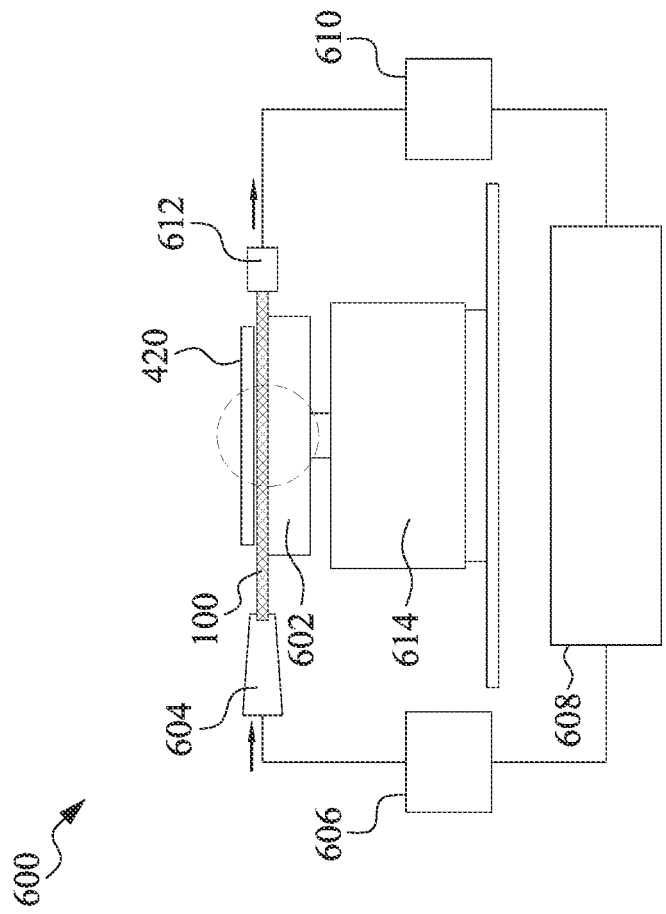
FIG. 6B
FIG. 6A

MAGNETIC POLISHING SLURRY AND METHOD FOR POLISHING A WORKPIECE

PRIORITY DATA

This patent claims the benefit of U.S. Provisional Patent Application Ser. No. 63/020,834 filed on May 6, 2020, the entire disclosure of which is hereby incorporated by reference.

BACKGROUND

Planarization operations are critical in semiconductor technology to achieve higher levels of device performance. During the planarization operations, undesired surface defects such as scratches, and topography may occur, which is detrimental to the electrical performance of the product device.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 6A illustrates a schematic view of a polishing apparatus for carrying out a method of polishing a workpiece in accordance with some embodiments of the present disclosure.

FIGS. 6B to 6F illustrate enlarged schematic partial views of the polishing apparatus shown in FIG. 6A for carrying out a method of polishing a workpiece in accordance with some embodiments of the present disclosure.

DETAILED DESCRIPTION

Figure 1:
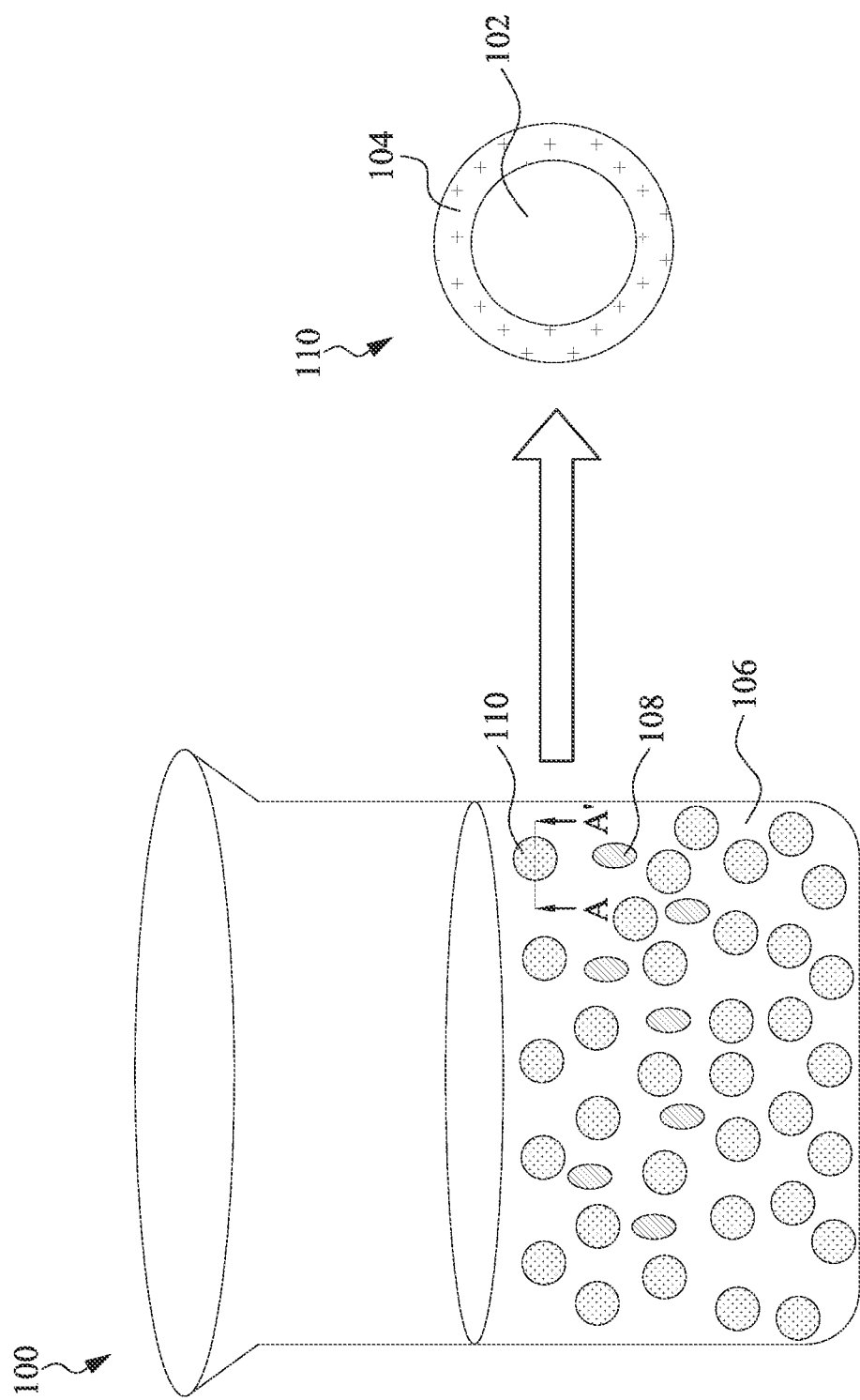
FIG. 1 illustrates a schematic view of a magnetic polishing slurry for polishing a workpiece in accordance with some embodiments of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

High precision planarization methods are required for making advanced optical or electronic devices. For example, at various operations in manufacturing an integrated circuit, surface topography from underlying layers can cause yield-limiting problems for the next manufacturing operation. Planarization thus becomes critical for achieving flat surfaces, which enables many of the advanced electronic devices in production.

Chemical mechanical polishing (CMP) is one of the methods for surface planarization. During a CMP operation, the substrate is mounted on a carrier or polishing head and the surface of the substrate to be polished is exposed. The exposed surface of the substrate is placed against a polishing pad. The carrier or polishing head provides a pressure, i.e., "a down force," on the substrate to push it against the polishing pad. A polishing slurry including abrasives is applied to the surface of the polishing pad for conducting the polishing operation.

Another planarization approach is magnetorheological finishing ("MRF"). MRF relies on a magnetorheological ("MR") fluid which is a suspension of magnetic particles and abrasives dispersed in a non-magnetic liquid carrier. The MR fluid exhibits magnetically-induced plastic behavior in the presence of a magnetic field. The apparent viscosity of the MR fluid can be magnetically increased by many orders of magnitude, such that the consistency of the fluid changes from being nearly watery to being a stiff paste. When such a paste is directed appropriately against a substrate surface to be polished, a high level of finishing quality, accuracy, and control can be achieved.

Some magnetic materials for producing the magnetic particles, such as iron, nickel and cobalt, have hardness higher than that of some of the materials used during the manufacturing of integrated circuit, such as copper. When using an MR fluid including iron magnetic particles to polish a silicon wafer with a conductive layer, such as a copper metallization layer, deposited thereon, undesired scratches may occur if the iron magnetic particles are in physical contact with the copper metallization layer during the polishing operation because iron has a hardness about 4, which is higher than that of copper, which is about 3.

The term "hardness" described herein may be determined by the Mohs scale of mineral hardness. The Mohs scale of mineral hardness is a qualitative ordinal scale characterizing scratch resistance of various minerals through the ability of a harder material to scratch a softer material. For example, the hardness of iron or nickel, is about 4, while copper has a hardness about 3.

Referring to FIG. 1, FIG. 1 illustrates a schematic view of a magnetic polishing slurry 100 for polishing a workpiece in accordance with some embodiments of the present disclosure. The magnetic polishing slurry 100 includes magnetic particles 102 coated with a modifying material 104, a liquid carrier 106 and abrasives 108. The modifying material 104 has a hardness lower than that of the workpiece to be polished. As shown in FIG. 1, the magnetic particles 102 coated with a modifying material 104 and the abrasives 108 are dispensed in the liquid carrier 106. In the absence of a magnetic field, the magnetic particles 102 coated with a modifying material 104 and the abrasives 108 are randomly dispensed in the liquid carrier 106. In the presence of a magnetic field, the magnetic particles 102 coated with a modifying material 104 magnetize and align along the magnetic field lines to form a stiffened ribbon-like polishing pad, and the abrasives 108 are squeezed out by a normal force provided by the accumulation of the magnetic particles 102 coated with a modifying material 104. In some embodiments, the magnetic polishing slurry 100 may be applied to a workpiece to be polished in the presence of a magnetic field so that the abrasives 108 are squeezed out to the interface between the magnetic particles 102 coated with a modifying material 104 and the workpiece to be polished and are in physical contact with the workpiece for polishing the workpiece. During the polishing operation, the modifying material 104 coated on the magnetic particles 102 alleviate direct physical contact between the magnetic particles 102 with the workpiece. Therefore, scratches on the workpiece are reduced. In some embodiments, the magnetic particles 102 coated with a modifying material 104 are used as micro polishing pads 110 when being applied to a workpiece to be polished.

The magnetic particles 102 include a magnetic material which magnetizes in the presence of a magnetic field. In some embodiments, the magnetic particles 102 may include a magnetic material such as iron, carbonyl iron, nickel, cobalt or their alloys. Examples of iron or cobalt alloys may include alloys of iron or cobalt with an f-block transition element. Examples of f-block transition elements may include lanthanides and actinides. Examples of alloys of cobalt with f block transition elements may include cobalt samarium alloy and cobalt neodymium alloy. The shape of the magnetic particles 102 may be determined by the workpiece to be trimmed. In some embodiments, the magnetic particles 102 may have a shape of a sphere, a spheroid, a cylinder, a rod, a disc, a flake, a needle, a fiber, a plate, a prismatic shape, or combinations thereof. In some embodiments, when trimming a workpiece such as a silicon wafer with one or more layers formed thereon, to provide a densely-packed ribbon-like polishing pad, the magnetic particles 102 may have a shape of a sphere, a spheroid or a combination thereof. The particle size of the magnetic particles 102 may be selected according to the size of the workpiece to be polished. In some embodiments, the magnetic particles 102 have an average particle size ranging from about 1.0 µm to about 5000 µm. In some embodiments, the magnetic particles 102 have a particle size ranging from about 5.0 µm to about 100 µm. For example, when using the magnetic polishing slurry 100 in polishing a silicon wafer with one or more layers formed thereon, the magnetic particles 102 may have a particle size ranging from about 5.0 µm to about 100 µm. The particle size of the magnetic particles 102 is determined by measuring the longest dimension of the magnetic particles 102. For example, when the magnetic particles 102 have a shape of a cylinder, the particle size of the magnetic particles 102 is determined by the length of the cylinder.

The workpiece may have a curved surface, a zigzag surface, or a planar surface. Examples of the workpiece may include an optical element such as an optical glass, a wafer and the like. In some embodiments, the wafer may include a silicon wafer. In some embodiments, the silicon wafer includes one or more layers formed thereon. Examples of the layer(s) may include a conductive layer, a semi-conductive layer and a dielectric layer. Examples of the conductive layer may include a metal layer such as a tungsten layer or a copper layer.

The modifying material 104 has a hardness lower than that of the workpiece to the polished and a property of retaining the magnetizing ability of the magnetic particles 102 in the presence of an external magnetic field. In some embodiments, the modifying material 104 may include elasticity. Therefore, when applying the magnetic polishing slurry 100 to the workpiece during a polishing operation, the magnetic particles 102 coated with the modifying material 104 buffers the normal force acted on the abrasives 108 for polishing the workpiece so as to alleviate local over-polishing. In some embodiments, the modifying material 104 may include a polymer. In some embodiments, the polymer may include an elastomer. Examples of the elastomer may include a homopolymeric elastomer or a copolymeric elastomer. Examples of the polymer may include a homopolymer or a copolymer. Examples of the homopolymer may include a thermoplastic or a thermosetting homopolymer such as polyurethane, polystyrene, polyepoxy resin, polyvinyl alcohol, fluoropolymer, polymethacrylate, polyacrylic acid, polyamide, Nylon 6, Nylon 66, polybutylene terephthalate (PBT), polycarbonates (PC), polyetheretherketone (PEEK), polyetherketone (PEK), polyethylene terephthalate (PET), polyimide, polyoxymethylene plastic ("POM" or "Acetal"), polyphenylene sulfide (PPS), polyphenylene oxide (PPO), polysulphone (PSU), polytetrafluoroethylene ("PTFE"), poly(methyl methacrylate) ("PMMA"), and rubber materials including natural rubber, isoprene rubber, butadiene rubber, chloroprene rubber, silicone rubber, and fluorosilicone rubber. Examples of the copolymer may include a thermosetting copolymer or a thermoplastic copolymer. Examples of the copolymer may include polyurethane copolymer, isobutylene-isoprene rubber, styrene-butadiene rubber, acrylonitrile-butadiene rubber, acrylonitrile butadiene styrene (ABS), hydrogenated nitrile butadiene rubber, ethylene-propylene rubber, poly (ethylene-vinyl acetate), or combinations thereof.

In some embodiments, the modifying material 104 is coated on the magnetic particles 102 to form a single-layered structure. In some embodiments, one or more species of the modifying materials 104 are coated on the magnetic particles 102 to form a multi-layered structure. In some embodiments, the modifying material 104 is partially coated on the magnetic particles to form a porous structure. In some embodiments, the magnetic polishing slurry 100 includes magnetic particles 102 coated with a modifying material 104 having a structure including a single-layered structure, a multi-layered structure, a porous structure, or combinations thereof. In some embodiments, the modifying material 104 coated on the magnetic particles 102 has an average thickness of nm to 100 nm.

In some embodiments, the magnetic polishing slurry 100 may further include on or more additives. Examples of the additives may include a pH-adjusting agent and a corrosion inhibitor. Examples of the pH adjusting agent may include an amine, an ammonium hydroxide, and an alkali metal hydroxide. Examples of the amine may include a primary, secondary, tertiary or quaternary amine such as triethanolamine, dimethylbenzylamine and ethoxybenzylamine. Examples of the ammonium hydroxide may include trimethylammonium hydroxide, triethylammonium hydroxide, and tetramethylammonium hydroxide (TMAH). Examples of the alkali metal hydroxide may include sodium hydroxide, and potassium hydroxide. In some embodiments, when the workpiece to be polished is a metal-containing wafer, the magnetic polishing slurry 100 may further includes a corrosion inhibitor to alleviate metal corrosion when contacting the metal-containing wafer with the magnetic polishing slurry. Examples of the corrosion inhibitor may include azole compounds, aliphatic amines, aromatic amines, aliphatic sulfonate and aromatic sulfonate. Examples of azole compounds may include 1,2,4-triazole and derivatives thereof, benzotriazole and derivatives thereof, 1,2,3-triazole and derivatives thereof, pyrazole and derivatives thereof, imidazole and derivatives thereof, benzimidazole and derivatives thereof, benzoate and derivatives thereof, isocyanurate and derivatives thereof, and mixtures thereof. Examples of aliphatic amines may include a $C_{6-22}$ linear or branched aliphatic amine. Examples of aliphatic sulfonate may include a $C_{6-22}$ linear or branched aliphatic sulfonate. Examples of aromatic amine may include a $C_{6-22}$ aromatic amine. Examples of aromatic sulfonate may include a $C_{6-22}$ aromatic sulfonate.

The liquid carrier 106 is a carrier medium in which the abrasives 108 and the magnetic particles 102 coated with a modifying material 104 are dispersed. In some embodiments, the liquid carrier 106 may include an aqueous medium, an oily medium or a combination thereof. Examples of the liquid carrier may include mineral oil, vegetable oil, silicone oil, small molecule glycols, glycoethers, water, and combinations thereof.

The abrasives 108 may be used for removing a part of the workpiece for planarization, for trimming edges of the workpiece, or for forming a curved surface of the workpiece. The abrasives 108 have a hardness higher than that of the workpiece. Examples of the abrasives 108 may include silicon oxide particles, cerium oxide particles, and combination thereof.

Figure 2:
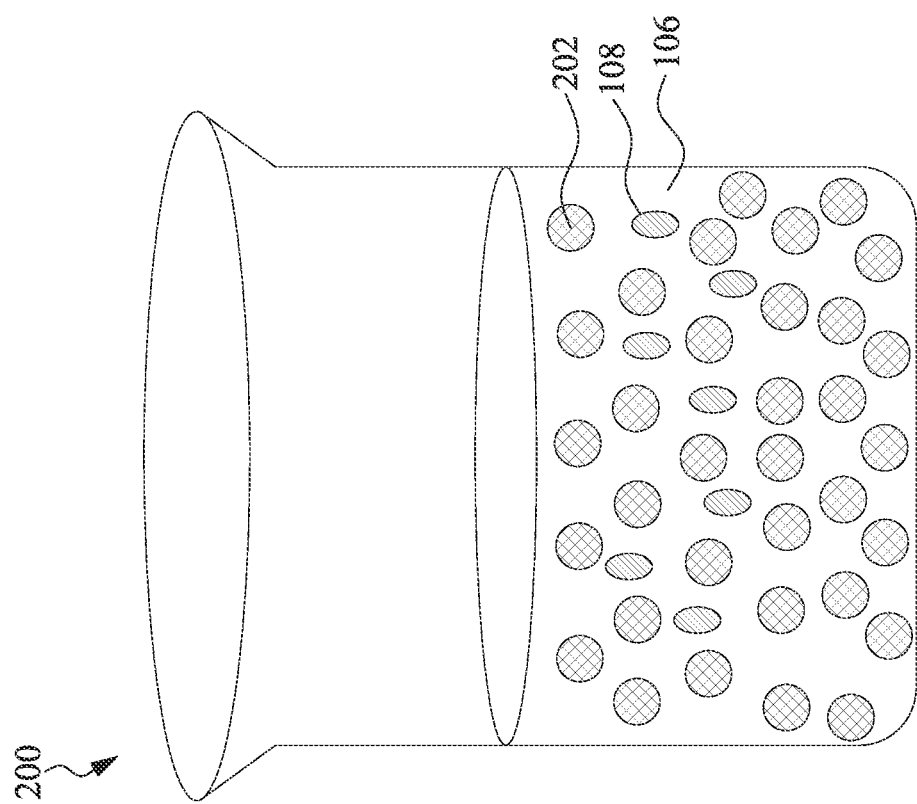
FIG. 2 illustrates a schematic view of a magnetic polishing slurry for polishing a workpiece in accordance with some embodiments of the present disclosure.

Referring to FIG. 2, FIG. 2 illustrates a schematic view of a magnetic polishing slurry for polishing a workpiece in accordance with some embodiments of the present disclosure. The magnetic polishing slurry 200 includes magnetic particles 202, a liquid carrier 106 and abrasives 108. The magnetic particles 202 have a hardness lower than a hardness of the workpiece.

In some embodiments, the magnetic particles 202 include a magnetic material such as europium, europium oxide, a europium alloy, a europium sulfate, an europium halide, a europium complex or combinations thereof. In some embodiments, when the magnetic particles 202 include europium, the slurry is substantially free of water because europium dissolves in water.

Figure 3:
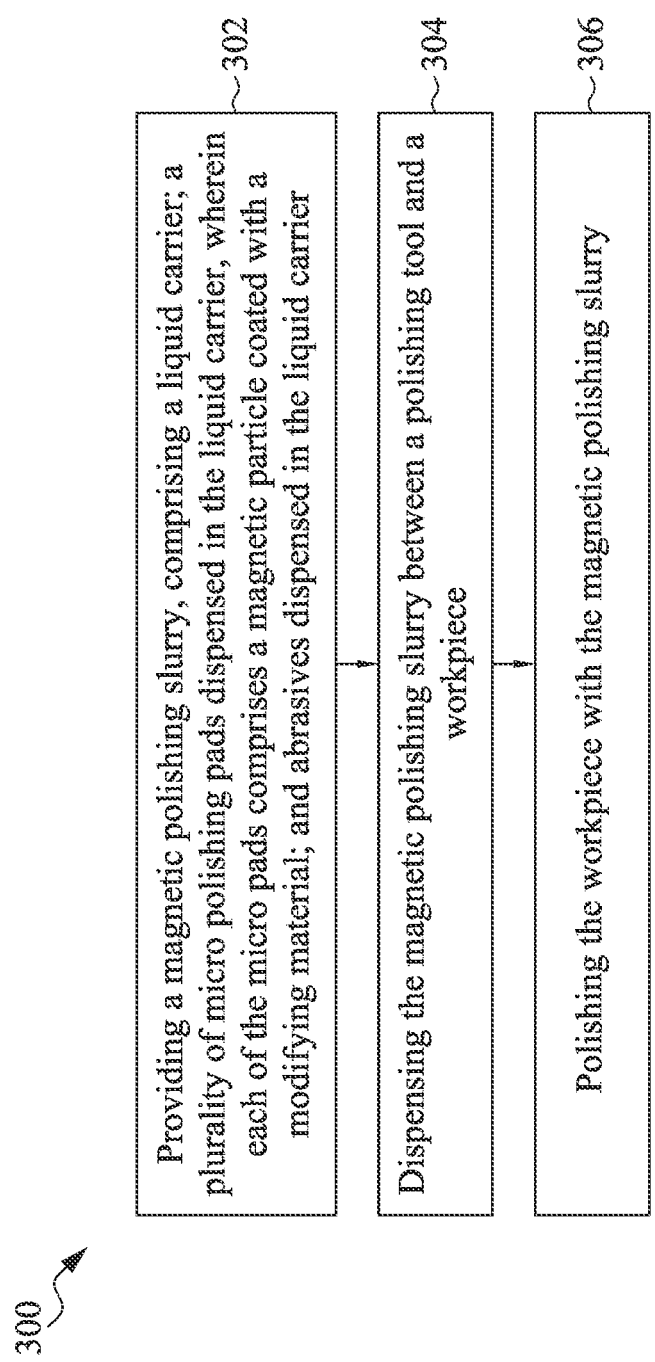
FIG. 3 illustrates a flowchart of a method of polishing a workpiece in accordance with some embodiments of the present disclosure.

Referring to FIG. 3, FIG. 3 illustrates a flowchart of a method of polishing a workpiece in accordance with some embodiments of the present disclosure. The method 300 begins with operation 302 in which a magnetic polishing slurry is provided. The magnetic polishing slurry includes a liquid carrier, a plurality of micro polishing pads dispersed in the liquid carrier, and abrasives dispersed in the liquid carrier. Each of the micro polishing pads includes a magnetic particle coated with a modifying material. The method 300 proceeds with operation 304 in which the magnetic polishing slurry is dispensed between a polishing tool and a workpiece. The method 300 continues with operation 306 in which the workpiece is polished with the magnetic polishing slurry.

Details for carrying out the operations 302, 304 and 306 of the method 300 are explained below with reference to FIG. 4A, FIG. 4B, FIG. 4C, FIG. 4D, FIG. 4E, FIG. 4F, FIG. 4G, FIG. 4H, FIG. 5A, FIG. 5B, FIG. 5C, FIG. 5D, FIG. 5E, FIG. 5F, FIG. 5G, FIG. 5H, FIG. 6A, FIG. 6B, FIG. 6C, FIG. 6D, FIG. 6E, and FIG. 6F with the magnetic polishing slurry 100 shown in FIG. 1.

Figure 4A:
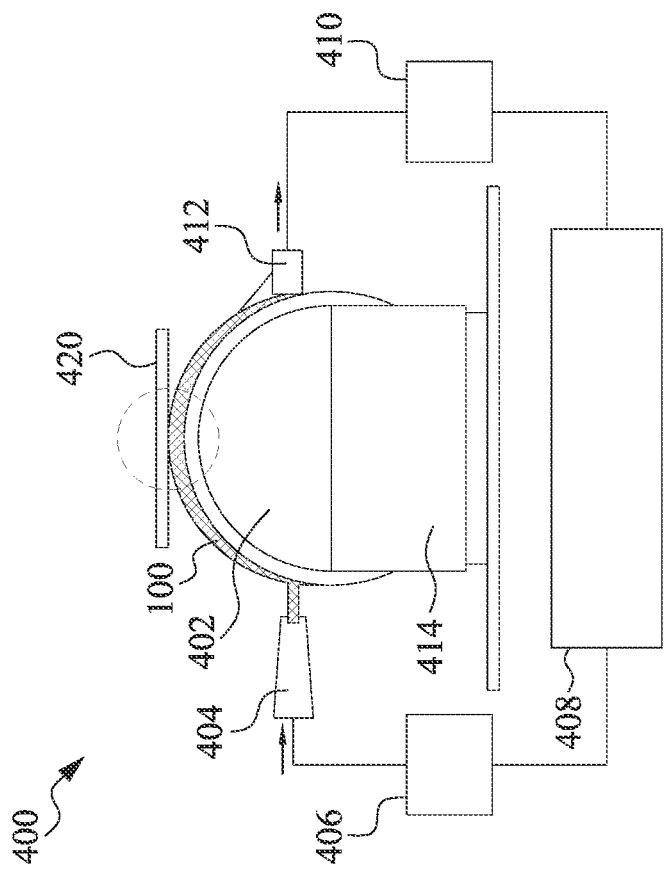
FIG. 4A illustrates a schematic view of a polishing apparatus for carrying out a method of polishing a workpiece in accordance with some embodiments of the present disclosure.

Refer to FIG. 4A. FIG. 4A illustrates a schematic view of a polishing apparatus for carrying out a method of polishing a workpiece in accordance with some embodiments of the present disclosure. In FIG. 4A, the polishing apparatus 400 includes a polishing tool 402, an injection nozzle 404, an injection pump 406, a magnetic polishing slurry tank 408, a suction pump 410, a suction nozzle 412, and an electromagnet 414. A workpiece 420 to be polished is placed above the polishing tool 402.

In some embodiments, the magnetic polishing slurry 100 provided is stored in a magnetic polishing slurry tank 408. The magnetic polishing slurry tank 408 is in flow connection with the injection pump 406 for delivering the magnetic polishing slurry 100 to the injection nozzle 404.

In some embodiments, the magnetic polishing slurry 100 is dispensed between a polishing tool 402 and a workpiece 420 by nozzle injection. The magnetic polishing slurry 100 delivered to the injection nozzle 404 is injected into a work zone (highlighted by a dotted line circle) between the polishing tool 402 and the workpiece 420 located above the polishing tool 402. The work zone is where the polishing operation takes place.

In some embodiments, the workpiece 420 is polished with the magnetic polishing slurry 100 by contacting the workpiece 420 with the magnetic polishing slurry 100 injected to the work zone between the polishing tool 402 and the workpiece 420 to remove a part of the workpiece 420 for planarization.

Figure 4B:
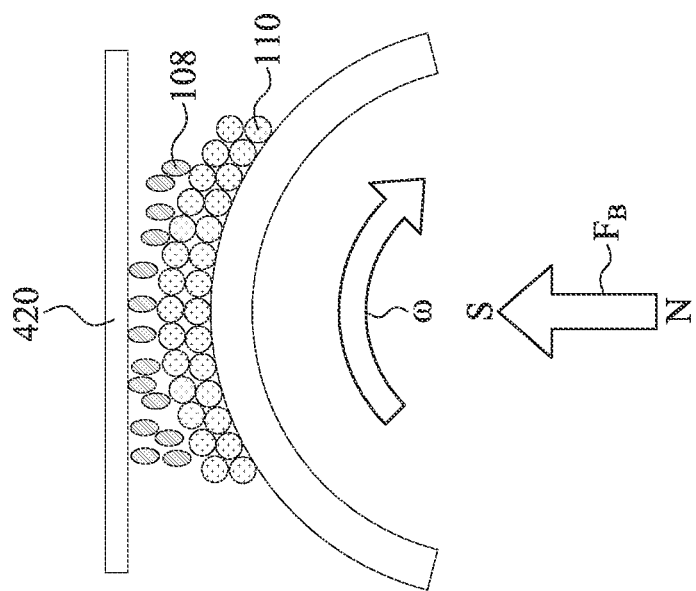
FIGS. 4B to 4H illustrate enlarged schematic partial views of the polishing apparatus shown in FIG. 4A for carrying out a method of polishing a workpiece in accordance with some embodiments of the present disclosure.

Refer to FIG. 4B. FIG. 4B illustrates an enlarged schematic partial view of the polishing apparatus shown in FIG. 4A for carrying out a method of polishing a workpiece in accordance with some embodiments of the present disclosure. In some embodiments, the workpiece 420 is polished with the magnetic polishing slurry 100 under a magnetic field $F_B$. In some embodiments, the magnetic field $F_B$ is generated to the work zone between the polishing tool 402 and the workpiece 420 by the electromagnet 414 located below the polishing tool 402. In the presence of the magnetic field $F_B$, the micro polishing pads 110 of the magnetic polishing slurry 100 accumulated at the work zone and on the surface of the polishing tool 402 to form a stiffened ribbon-like polishing pad aligned to the magnetic field lines generated by the magnetic field $F_B$. In the presence of the magnetic field $F_B$, the accumulation of the micro polishing pads 110 provides a normal force to the abrasives 108 of the magnetic polishing slurry 100 at the work zone so that the abrasives 108 are squeezed out to the interface between the micro polishing pads 110 and the workpiece 420 and are in physical contact with the workpiece 420 to polish the workpiece 420.

In some embodiments, the workpiece 420 is polished with the magnetic polishing slurry 100 by moving the polishing tool 402 relative to the workpiece 420. Examples of moving the polishing tool 402 relative to the workpiece 420 may include rotating the polishing tool 402 around an axis parallel to the workpiece 420, horizontally moving the polishing tool 402 relative to the workpiece 420, vertically moving the polishing tool 402 relative to the workpiece 420. In some embodiments, moving the polishing tool 402 relative to the workpiece 420 may include moving the polishing tool 402 only, moving the workpiece 420 only, and moving both the polishing tool 402 and the workpiece 420. In some embodiments, moving both the polishing tool 402 and the workpiece 420 includes moving the polishing tool 402 and the workpiece 420 alternately, and moving the polishing tool 402 and the workpiece 420 simultaneously.

Refer back to FIG. 4B. In some embodiments, the polishing tool 402 includes a polishing wheel or a polishing drum which rotates around an axis parallel to the workpiece 420. In some embodiments, the polishing tool 402 rotates and provides the abrasives 108 a shear force for polishing the workpiece 420. Polishing the workpiece 420 with the abrasives 108 through a shear force also alleviates the occurrence of scratches on the surface of the workpiece 420.

Figure 4C:
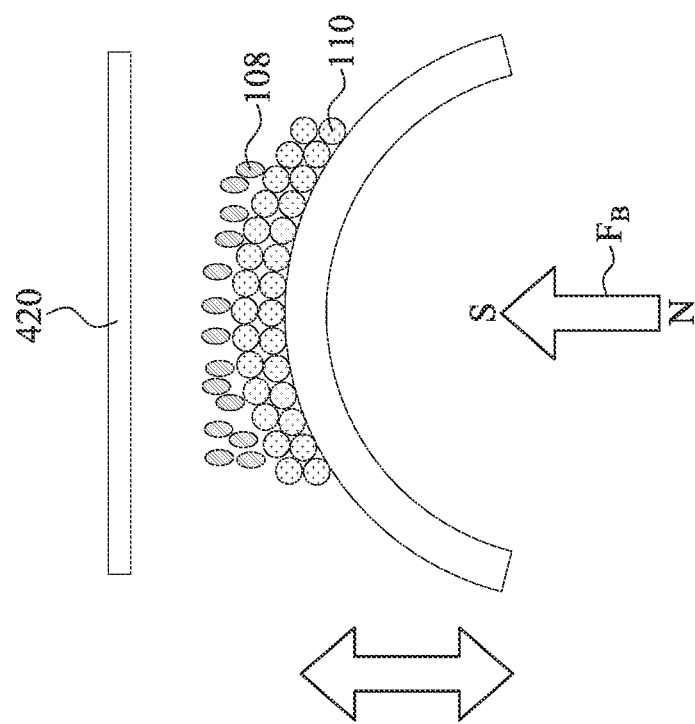

Refer to FIG. 4C. FIG. 4C illustrates an enlarged schematic partial view of the polishing apparatus shown in FIG. 4A for carrying out a method of polishing a workpiece in accordance with some embodiments of the present disclosure. In some embodiments, for a workpiece 420 having a large surface for planarization, after a part of the workpiece 420 is polished by the magnetic polishing slurry 100 at an initial work zone between the workpiece 420 and the polishing tool 402, the polishing tool 402 moves horizontally relative to the workpiece 420 so as to form another work zone between another part of the workpiece 420 and the polishing tool 402 for further polishing.

Figure 4D:
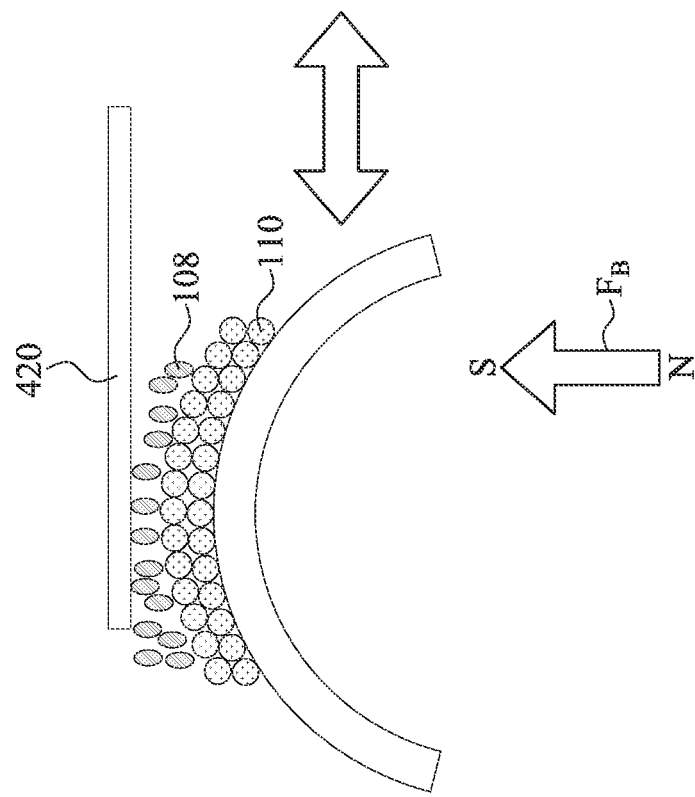

Refer to FIG. 4D. FIG. 4D illustrates a schematic enlarged partial view of the polishing apparatus shown in FIG. 4A for carrying out a method of polishing a workpiece in accordance with some embodiments of the present disclosure. In some embodiments, the polishing tool 402 moves vertically relative to the workpiece 420. In some embodiments, the polishing tool 402 moves towards the workpiece 420 so as to provide the abrasives 108 additional normal force to the workpiece 420 to accelerate local polishing. In some embodiments, the polishing tool 402 moves away from the workpiece 420 to decelerate local polishing.

Figure 4F:
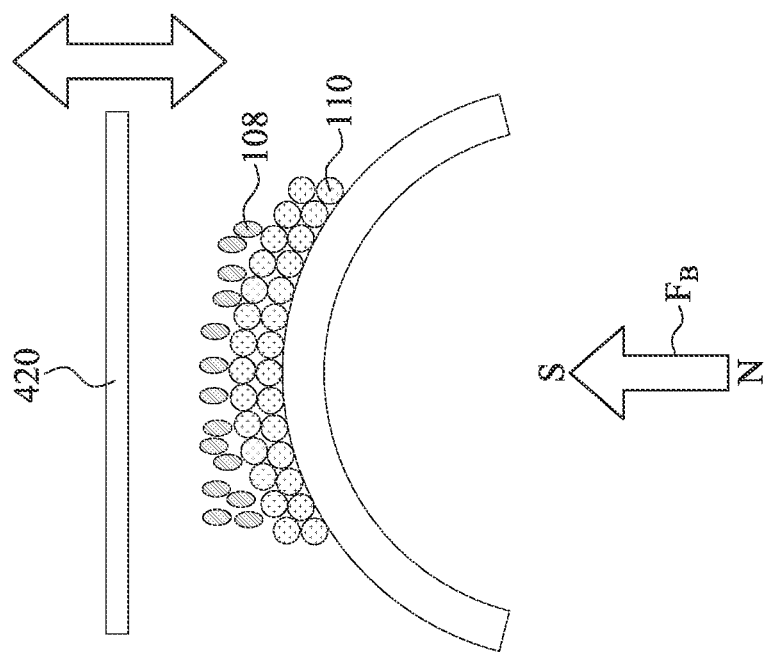
Figure 4E:
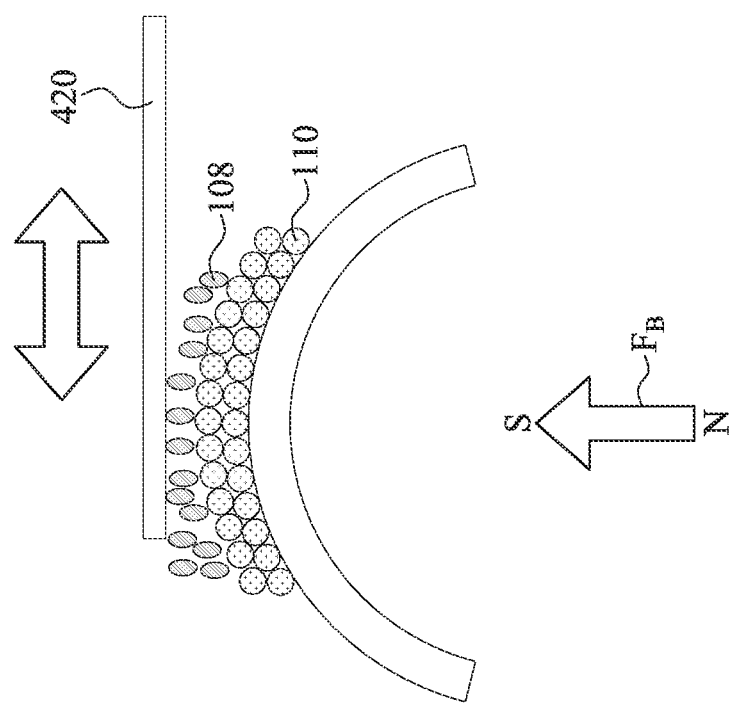

Refer to FIG. 4E. FIG. 4E illustrates an enlarged schematic partial view of the polishing apparatus shown in FIG. 4A for carrying out a method of polishing a workpiece in accordance with some embodiments of the present disclosure. In some embodiments, for a workpiece 420 having a large surface for planarization, after a part of the workpiece 420 is polished by the magnetic polishing slurry 100 at an initial work zone between the workpiece 420 and the polishing tool 402, the workpiece 420 moves horizontally relative to the polishing tool 402 so as to form another work zone between another part of the workpiece 420 and the polishing tool 402 for further polishing.

Refer to FIG. 4F. FIG. 4F illustrates an enlarged schematic partial view of the polishing apparatus shown in FIG. 4A for carrying out a method of polishing a workpiece in accordance with some embodiments of the present disclosure. In some embodiments, the workpiece 420 moves vertically relative to the polishing tool 402. In some embodiments, the workpiece 420 moves towards the polishing tool 402 so as to provide additional normal force to the abrasives 108 to accelerate local polishing. In some embodiments, the workpiece 420 moves away from the polishing tool 400 to decelerate local polishing.

Figure 4G:
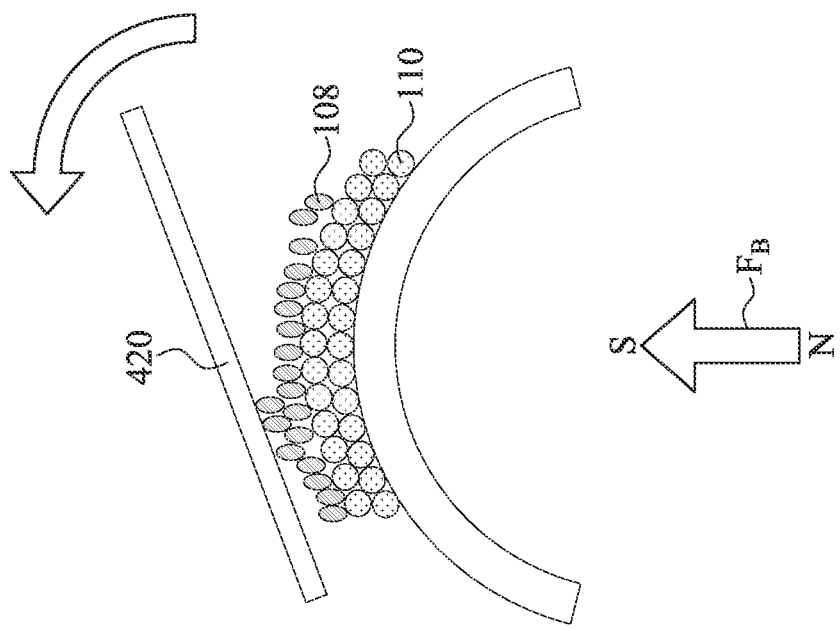
Figure 4H:
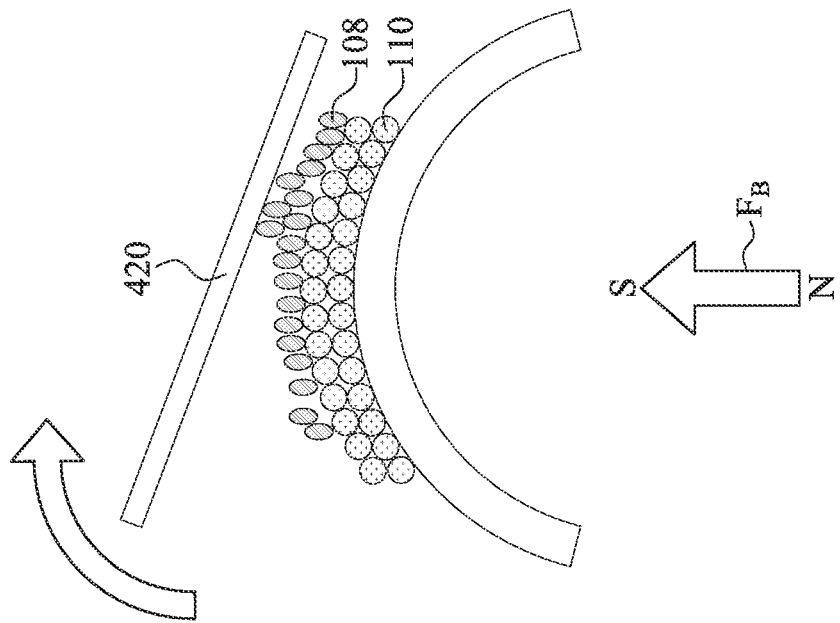

Refer to FIG. 4G and FIG. 4H. Each of FIG. 4G and FIG. 4H illustrates an enlarged schematic partial view of the polishing apparatus shown in FIG. 4A for carrying out a method of polishing a workpiece in accordance with some embodiments of the present disclosure. In some embodiments, after a part of the workpiece 420 is polished by the magnetic polishing slurry 100 at an initial work zone between the workpiece 420 and the polishing tool 402, the workpiece 420 may tilt to the left or to the right to form another work zone between another part of the workpiece 420 to be polished and the polishing tool 402 for polishing. In some embodiments, the workpiece 420 may have a curved surface. The workpiece 420 may rotates on a spindle while sweeping to the left or to the right about its radius of curvature to be polished by the abrasive particles 108.

Figure 5A:
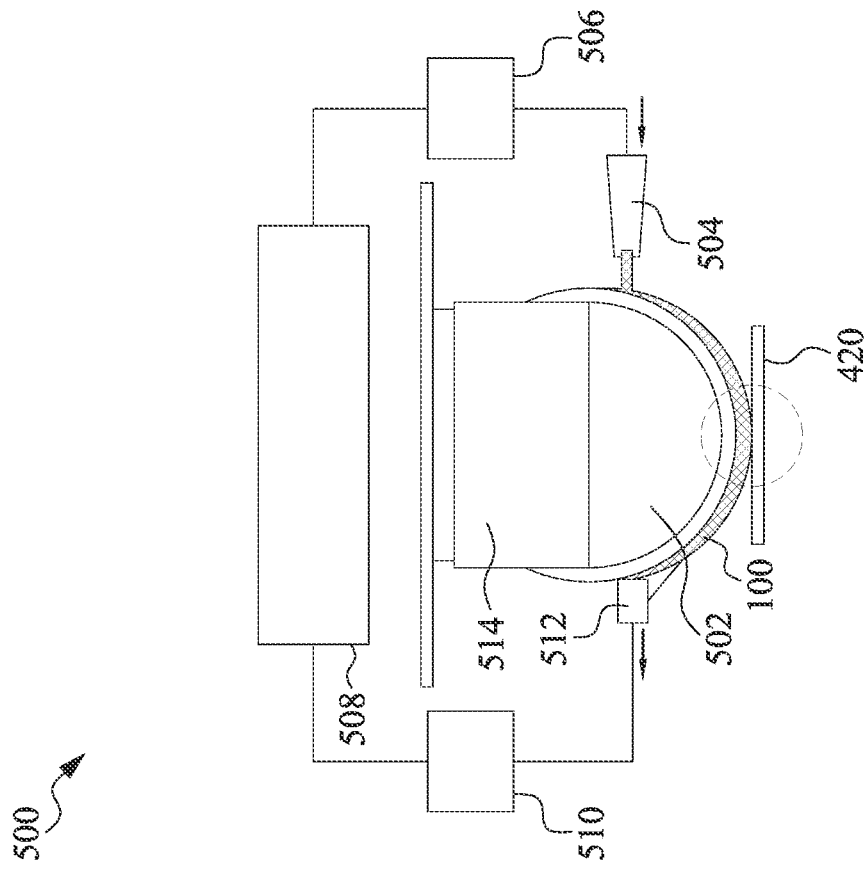
FIG. 5A illustrates a schematic view of a polishing apparatus for carrying out a method of polishing a workpiece in accordance with some embodiments of the present disclosure.

Refer to FIG. 5A. FIG. 5A illustrates a schematic view of a polishing apparatus for carrying out a method of polishing a workpiece in accordance with some embodiments of the present disclosure. In FIG. 5A, the polishing apparatus 500 includes a polishing tool 502, an injection nozzle 504, an injection pump 506, a magnetic polishing slurry tank 508, a suction pump 510, a suction nozzle 512, and an electromagnet 514. A workpiece 420 to be polished is placed below the polishing tool 502.

In some embodiments, the magnetic polishing slurry 100 provided is stored in a magnetic polishing slurry tank 508. The magnetic polishing slurry tank 508 is in flow connection with the injection pump 506 for delivering the magnetic polishing slurry 100 to the injection nozzle 504.

In some embodiments, the magnetic polishing slurry 100 is dispensed between a polishing tool 502 and a workpiece 420 by nozzle injection. The magnetic polishing slurry 100 delivered to the injection nozzle 504 is injected into a work zone (highlighted by a dotted line circle) between the polishing tool 502 and the workpiece 420 located above the polishing tool 502. The work zone is where the polishing operation takes place.

In some embodiments, the workpiece 420 is polished with the magnetic polishing slurry 100 by contacting the workpiece 420 with the magnetic polishing slurry 100 injected to the work zone between the polishing tool 502 and the workpiece 420 to remove a part of the workpiece 420 for planarization.

Figure 5B:
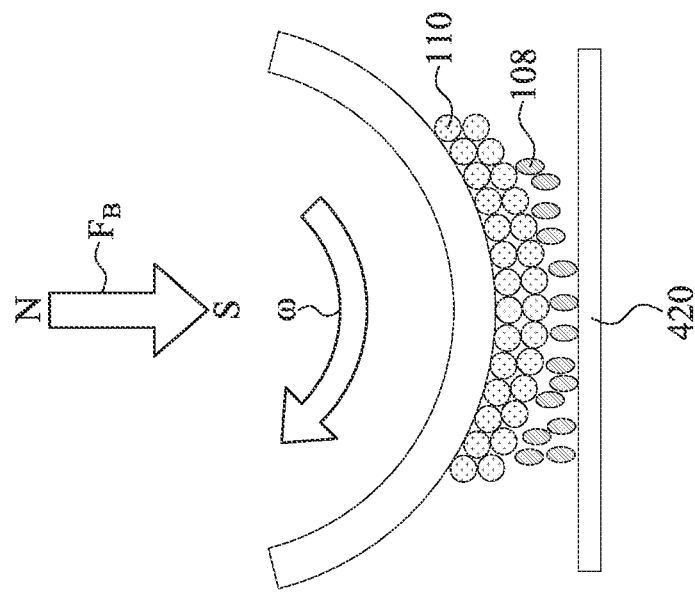
FIGS. 5B to 5H illustrate enlarged schematic partial views of the polishing apparatus shown in FIG. 5A for carrying out a method of polishing a workpiece in accordance with some embodiments of the present disclosure.

Refer to FIG. 5B. FIG. 5B illustrates an enlarged schematic partial view of the polishing apparatus shown in FIG. 4A for carrying out a method of polishing a workpiece in accordance with some embodiments of the present disclosure. In some embodiments, the workpiece 420 is polished with the magnetic polishing slurry 100 under a magnetic field $F_B$. In some embodiments, the magnetic field $F_B$ is generated to the work zone between the polishing tool 502 and the workpiece 420 by the electromagnet 514 located above the polishing tool 502. In the presence of the magnetic field $F_B$, the micro polishing pads 110 of the magnetic polishing slurry 100 accumulated at the work zone and on the surface of the polishing tool 502 to form a stiffened ribbon-like polishing pad aligned to the magnetic field lines generated by the magnetic field $F_B$. In the presence of the magnetic field $F_B$, the accumulation of the micro polishing pads 110 provides a normal force to the abrasives 108 of the magnetic polishing slurry 100 at the work zone so that the abrasives 108 are squeezed out to the interface between the micro polishing pads 110 and the workpiece 420 and are in physical contact with the workpiece 420 to polish the workpiece 420.

In some embodiments, the workpiece 420 is polished with the magnetic polishing slurry 100 by moving the polishing tool 502 relative to the workpiece 420. Examples of moving the polishing tool 502 relative to the workpiece 420 may include rotating the polishing tool 502 around an axis parallel to the workpiece 420, horizontally moving the polishing tool 502 relative to the workpiece 420, vertically moving the polishing tool 502 relative to the workpiece 420. In some embodiments, moving the polishing tool 502 relative to the workpiece 420 may include moving the polishing tool 502 only, moving the workpiece 420 only, and moving both the polishing tool 502 and the workpiece 420. In some embodiments, moving both the polishing tool 502 and the workpiece 420 includes moving the polishing tool 502 and the workpiece 420 alternately, and moving the polishing tool 502 and the workpiece 420 simultaneously.

Refer back to FIG. 5B. In some embodiments, the polishing tool 502 includes a polishing wheel or a polishing drum which rotates around an axis parallel to the workpiece 420. In some embodiments, the polishing tool 502 rotates and provides the abrasives 108 a shear force for polishing the workpiece 420. Polishing the workpiece 420 with the abrasives 108 through a shear force also alleviates the occurrence of scratches on the surface of the workpiece 420.

Figure 5C:
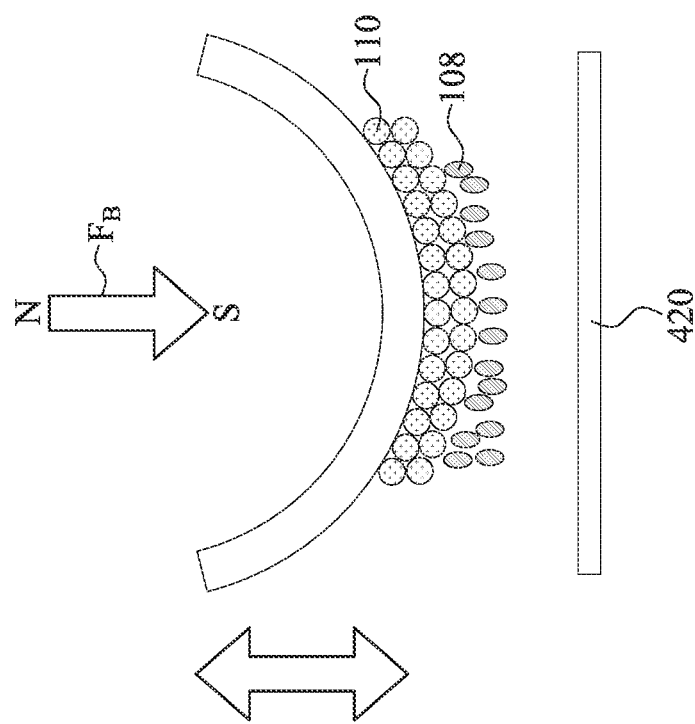

Refer to FIG. 5C. FIG. 5C illustrates a schematic enlarged partial view of the polishing apparatus shown in FIG. 5A for carrying out a method of polishing a workpiece in accordance with some embodiments of the present disclosure. In some embodiments, for a workpiece 420 having a large surface for planarization, after a part of the workpiece 420 is polished by the magnetic polishing slurry 100 at an initial work zone between the workpiece 420 and the polishing tool 502, the polishing tool 502 moves horizontally relative to the workpiece 420 so as to form another work zone between another part of the workpiece 420 and the polishing tool 502 for further polishing.

Figure 5D:
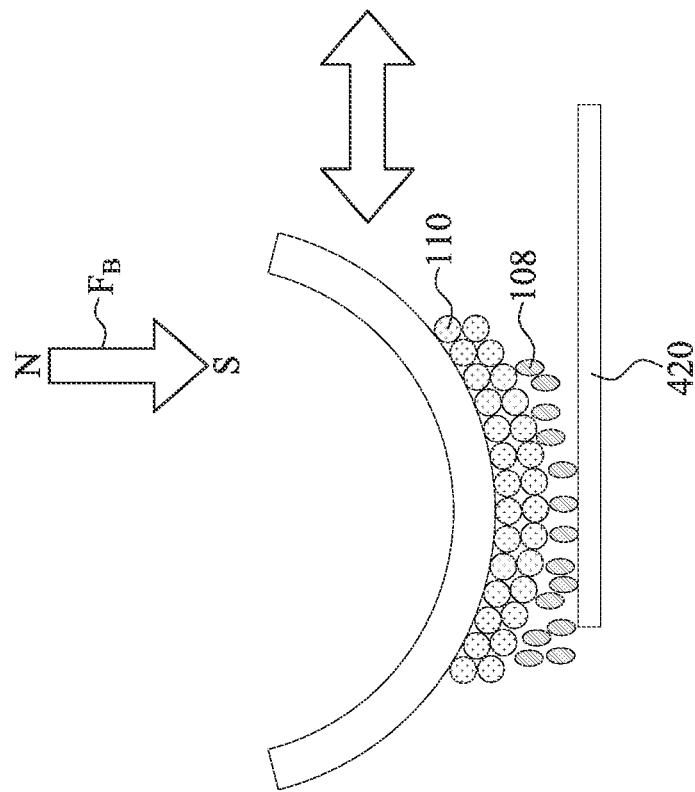

Refer to FIG. 5D. FIG. 5D illustrates a schematic enlarged partial view of the polishing apparatus shown in FIG. 5A for carrying out a method of polishing a workpiece in accordance with some embodiments of the present disclosure. In some embodiments, the polishing tool 502 moves vertically relative to the workpiece 420. In some embodiments, the polishing tool 502 moves towards the workpiece 420 so as to provide the abrasives 108 additional normal force to the workpiece 420 to accelerate local polishing. In some embodiments, the polishing tool 502 moves away from the workpiece 420 to decelerate local polishing.

Figure 5F:
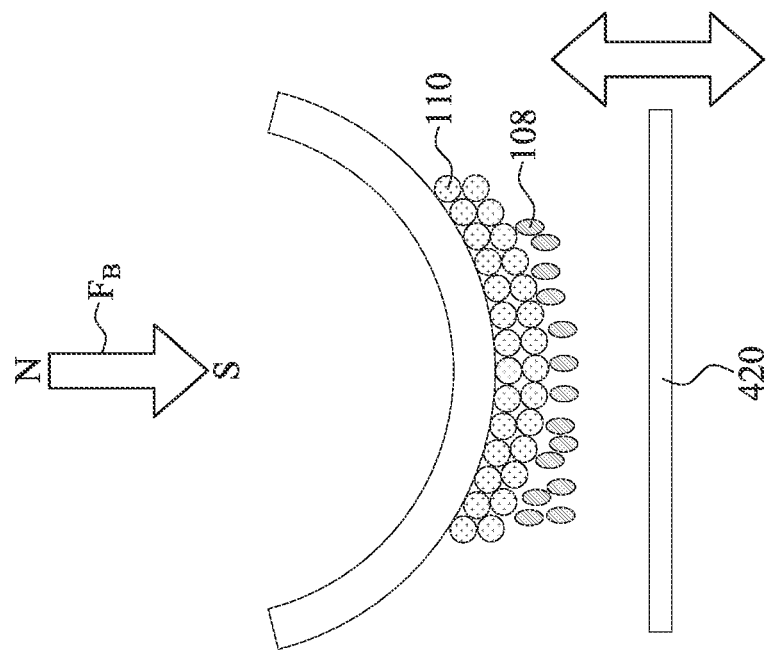
Figure 5E:
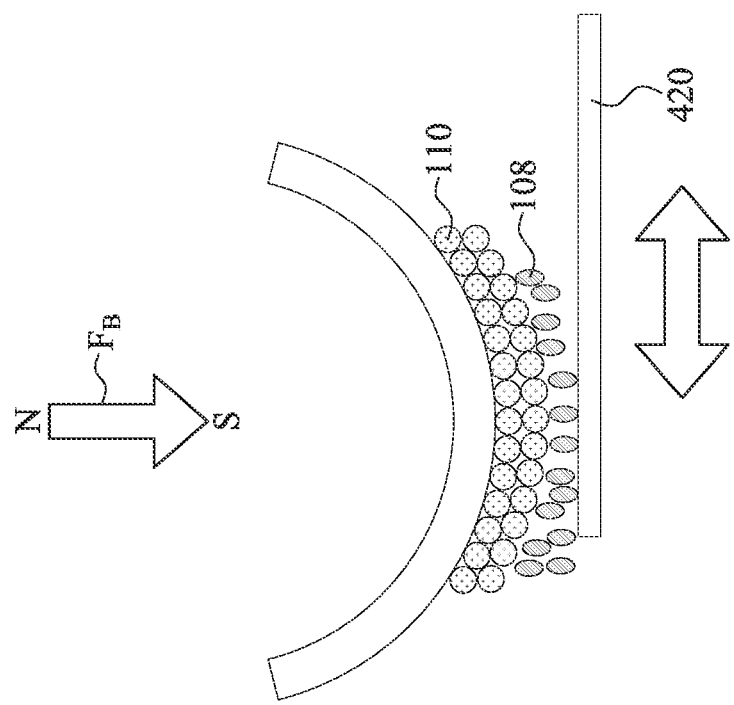

Refer to FIG. 5E. FIG. 5E illustrates a schematic enlarged partial view of the polishing apparatus shown in FIG. 5A for carrying out a method of polishing a workpiece in accordance with some embodiments of the present disclosure. In some embodiments, for a workpiece 420 having a large surface for planarization, after a part of the workpiece 420 is polished by the magnetic polishing slurry 100 at an initial work zone between the workpiece 420 and the polishing tool 502, the workpiece 420 moves horizontally relative to the polishing tool 502 so as to form another work zone between another part of the workpiece 420 and the polishing tool 502 for further polishing.

Refer to FIG. 5F. FIG. 5F illustrates a schematic enlarged partial view of the polishing apparatus shown in FIG. 5A for carrying out a method of polishing a workpiece in accordance with some embodiments of the present disclosure. In some embodiments, the workpiece 420 moves vertically relative to the polishing tool 502. In some embodiments, the workpiece 420 moves towards the polishing tool 502 so as to provide additional normal force to the abrasives 108 to accelerate local polishing. In some embodiments, the workpiece 420 moves away from the polishing tool 400 to decelerate local polishing.

Figure 5G:
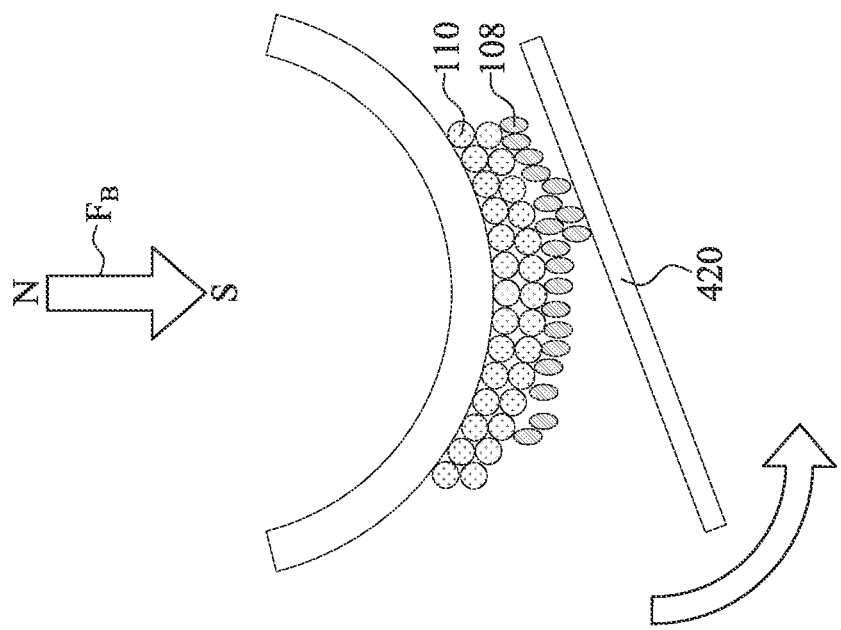
Figure 5H:
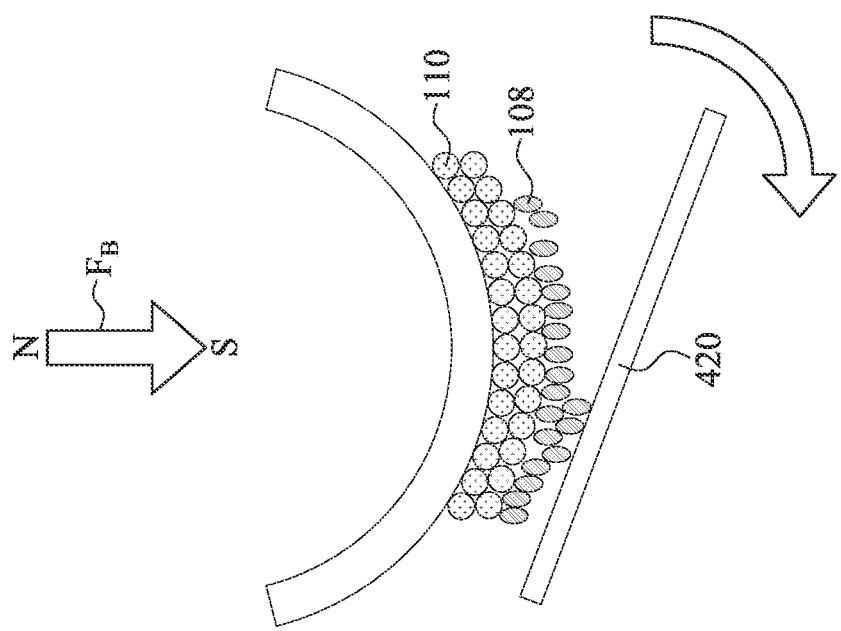

Refer to FIG. 5G and FIG. 5H. Each of FIG. 5G and FIG. 5H illustrates a schematic enlarged partial view of the polishing apparatus shown in FIG. 5A for carrying out a method of polishing a workpiece in accordance with some embodiments of the present disclosure. In some embodiments, after a part of the workpiece 420 is polished by the magnetic polishing slurry 100 at an initial work zone between the workpiece 420 and the polishing tool 402, the workpiece 420 may tilt to the left or to the right to form another work zone between another part of the workpiece 420 to be polished and the polishing tool 502 for polishing. In some embodiments, the workpiece 420 may have a curved surface. The workpiece 420 may rotates on a spindle while sweeping to the left or to the right about its radius of curvature to be polished by the abrasive particles 108.

Refer to FIG. 6A. FIG. 6A illustrates a schematic view of a polishing apparatus for carrying out a method of polishing a workpiece in accordance with some embodiments of the present disclosure. In FIG. 6A, the polishing apparatus 600 includes a polishing tool 602, an injection nozzle 604, an injection pump 606, a magnetic polishing slurry tank 608, a suction pump 610, a suction nozzle 612, and an electromagnet 614. The workpiece 420 to be polished is placed above the polishing tool 602.

In some embodiments, the magnetic polishing slurry 100 provided is stored in a magnetic polishing slurry tank 608. The magnetic polishing slurry tank 608 is in flow connection with the injection pump 606 for delivering the magnetic polishing slurry 100 to the injection nozzle 604.

In some embodiments, the magnetic polishing slurry 100 is dispensed between a polishing tool 602 and a workpiece 420 by nozzle injection. The magnetic polishing slurry 100 delivered to the injection nozzle 604 is injected into a zone between the polishing tool 602 and the workpiece 420 located above the polishing tool 602.

In some embodiments, the workpiece 420 is polished with the magnetic polishing slurry 100 by contacting the workpiece 420 with the magnetic polishing slurry 100 injected to the work zone between the polishing tool 602 and the workpiece 420 to remove a part of the workpiece 420 for planarization.

Refer to FIG. 6B. FIG. 6B illustrates an enlarged schematic partial view of the polishing apparatus shown in FIG. 6A for carrying out a method of polishing a workpiece in accordance with some embodiments of the present disclosure. In some embodiments, the workpiece 420 is polished with the magnetic polishing slurry 100 under a magnetic field $F_B$. In some embodiments, the magnetic field $F_B$ is generated to the work zone between the polishing tool 602 and the workpiece 420 by the electromagnet 514 located below the polishing tool 602. In the presence of the magnetic field $F_B$, the micro polishing pads 110 of the magnetic polishing slurry 100 accumulated at the work zone and on the surface of the polishing tool 602 to form a stiffened ribbon-like polishing pad aligned to the magnetic field lines generated by the magnetic field $F_B$. In the presence of the magnetic field $F_B$, the accumulation of the micro polishing pads 110 provides a normal force to the abrasives 108 of the magnetic polishing slurry 100 at the work zone so that the abrasives 108 are squeezed out to the interface between the micro polishing pads 110 and the workpiece 420 and are in physical contact with the workpiece 420 to polish the workpiece 420.

In some embodiments, the workpiece 420 is polished with the magnetic polishing slurry 100 by moving the polishing tool 602 relative to the workpiece 420. Examples of moving the polishing tool 602 relative to the workpiece 420 may include rotating the polishing tool 602 around an axis normal to the workpiece 420, horizontally moving the polishing tool 602 relative to the workpiece 420, vertically moving the polishing tool 602 relative to the workpiece 420. In some embodiments, moving the polishing tool 602 relative to the workpiece 420 may include moving the polishing tool 602 only, moving the workpiece 420 only, and moving both the polishing tool 602 and the workpiece 420. In some embodiments, moving both the polishing tool 502 and the workpiece 420 includes moving the polishing tool 602 and the workpiece 420 alternately, and moving the polishing tool 602 and the workpiece 420 simultaneously.

Refer back to FIG. 6B. In some embodiments, the polishing tool 602 includes a disc-like polishing wheel or a disc-like polishing drum which rotates around an axis normal to the workpiece 420. In some embodiments, the polishing tool 602 rotates and thus provides a shear force to the abrasive particles 108 in physical contact with the workpiece 420 for polishing the workpiece 420. Polishing the workpiece 420 with the abrasives 108 through a shear force also alleviates the occurrence of scratches on the surface of the workpiece 420.

Figure 6C:
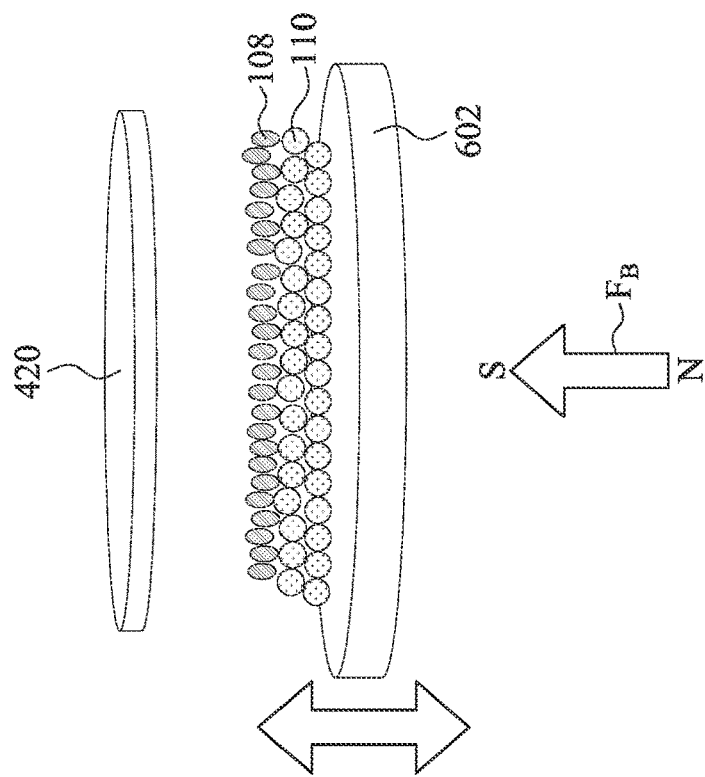

Refer to FIG. 6C. FIG. 6C illustrates a schematic enlarged partial view of the polishing apparatus shown in FIG. 6A for carrying out a method of polishing a workpiece in accordance with some embodiments of the present disclosure. In some embodiments, for a workpiece 420 having a large surface for planarization, after a part of the workpiece 420 is polished by the magnetic polishing slurry 100 at an initial work zone between the workpiece 420 and the polishing tool 502, the polishing tool 502 moves horizontally relative to the workpiece 420 so as to form another work zone between another part of the workpiece 420 and the polishing tool 502 for further polishing.

Figure 6D:
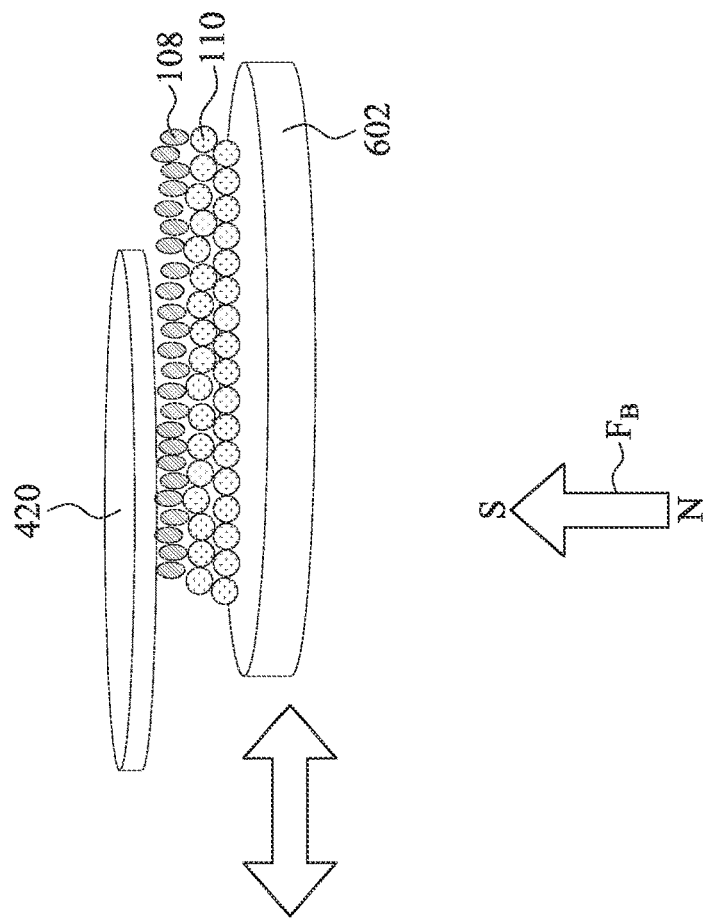

Refer to FIG. 6D. FIG. 6D illustrates a schematic enlarged partial view of the polishing apparatus shown in FIG. 6A for carrying out a method of polishing a workpiece in accordance with some embodiments of the present disclosure. In some embodiments, the polishing tool 602 moves vertically relative to the workpiece 420. In some embodiments, the polishing tool 602 moves towards the workpiece 420 so as to provide the abrasives 108 additional normal force to the workpiece 420 to accelerate local polishing. In some embodiments, the polishing tool 602 moves away from the workpiece 420 to decelerate local polishing.

Figure 6F:
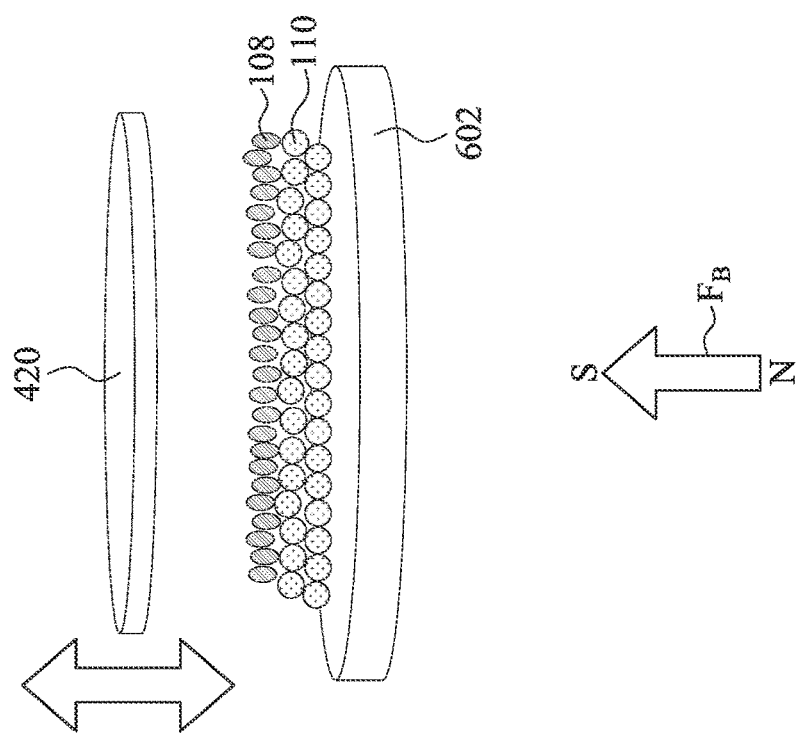
Figure 6E:
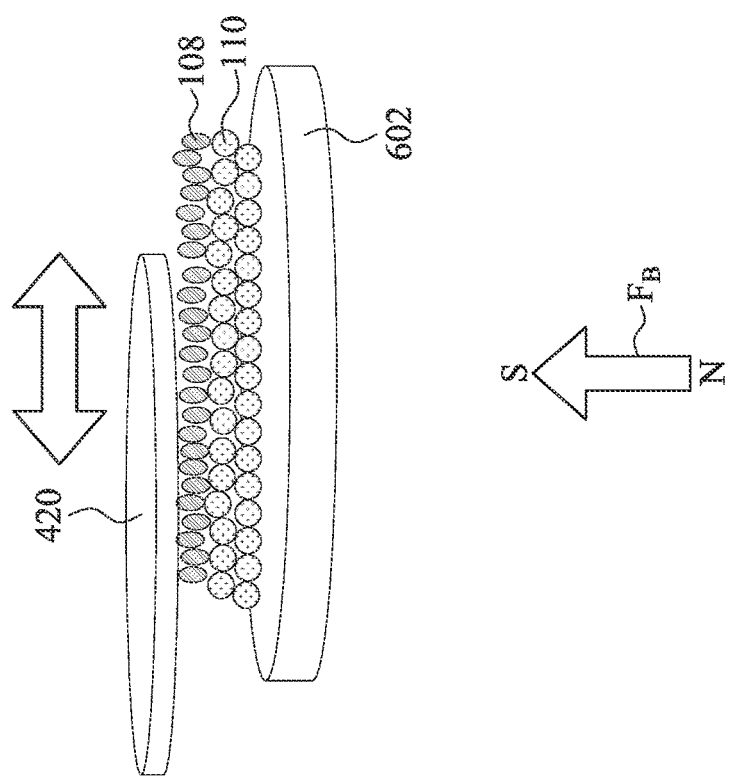

Refer to FIG. 6E. FIG. 6E illustrates a schematic enlarged partial view of the polishing apparatus shown in FIG. 6A for carrying out a method of polishing a workpiece in accordance with some embodiments of the present disclosure. In some embodiments, for a workpiece 420 having a large surface for planarization, after a part of the workpiece 420 is polished by the magnetic polishing slurry 100 at an initial work zone between the workpiece 420 and the polishing tool 602, the workpiece 420 moves horizontally relative to the polishing tool 602 so as to form another work zone between another part of the workpiece 420 and the polishing tool 602 for further polishing.

Refer to FIG. 6F. FIG. 6F illustrates a schematic enlarged partial view of the polishing apparatus shown in FIG. 6A for carrying out a method of polishing a workpiece in accordance with some embodiments of the present disclosure. In some embodiments, the workpiece 420 moves vertically relative to the polishing tool 602. In some embodiments, the workpiece 420 moves towards the polishing tool 602 so as to provide additional normal force to the abrasives 108 to accelerate local polishing. In some embodiments, the workpiece 420 moves away from the polishing tool 400 to decelerate local polishing.

Accordingly, the present disclosure therefore provides a magnetic polishing slurry for polishing a workpiece and a method of polishing a workpiece. In some embodiments, by using magnetic particles coated with a modifying material having a hardness lower than that of the workpiece, scratches on the surface of the workpiece after being polished by the magnetic polishing slurry are alleviated, and surface planarization of the workpiece is improved. In some embodiment, polishing the workpiece with the abrasives through a shear force also alleviates the occurrence of scratches on the surface of the workpiece.

In some embodiments, a magnetic polishing slurry for polishing a workpiece is provided. The magnetic polishing slurry includes magnetic particles coated with a modifying material, a liquid carrier and abrasives. The modifying material has a hardness lower than a hardness of the workpiece.

In some embodiments, a magnetic polishing slurry for polishing a workpiece is provided. The magnetic polishing slurry includes magnetic particles, a liquid carrier and abrasives. The magnetic particles have a hardness lower than a hardness of the workpiece.

In some embodiments, a method of polishing a workpiece is provided. The method includes following operations. A magnetic polishing slurry is provided. The magnetic polishing slurry is dispensed between a polishing tool and a workpiece. The workpiece is polished with the magnetic polishing slurry. In some embodiments, the magnetic polishing slurry includes a liquid carrier, a plurality of micro polishing pads dispensed in the liquid carrier, wherein each of the micro polishing pads includes a magnetic particle coated with a modifying material.

The foregoing outlines features of several embodiments so that those skilled in the art may better understand the aspects of the present disclosure. Those skilled in the art should appreciate that they may readily use the present disclosure as a basis for designing or modifying other operations and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A magnetic polishing slurry for polishing a wafer, comprising:
   magnetic particles coated with a modifying material, wherein a hardness of the modifying material is lower than a hardness of the wafer;
   a liquid carrier, which is an oily medium selected from mineral oil, vegetable oil, silicone oil, and combinations thereof;
   abrasives;
   a corrosion inhibitor selected from the group consisting of: 1,2,4-triazole and derivatives thereof, 1,2,3-triazole and derivatives thereof, pyrazole and derivatives thereof, imidazole, benzimidazole and derivatives thereof, isocyanurate and derivatives thereof, an aromatic amine, and combinations thereof; and
   a pH-adjusting agent selected from triethanolamine, dimethylbenzylamine and ethoxybenzylamine,
   wherein the modifying material comprises a polymer, and wherein the polymer comprises an elastomer.

2. The magnetic polishing slurry according to claim 1, wherein the abrasives are selected from the group consisting of: silicon oxide particles, cerium oxide particles, and combination thereof.

3. The magnetic polishing slurry according to claim 1, wherein the elastomer comprises a homopolymeric elastomer, a copolymeric elastomer or a combination thereof.

4. The magnetic polishing slurry according to claim 1, wherein the polymer comprises a thermoplastic polymer, a thermosetting polymer or a combination thereof.

5. The magnetic polishing slurry according to claim 1, wherein the polymer comprises polyurethane, polystyrene, polyepoxy resin, polyvinyl alcohol, fluoropolymer, polymethacrylate, polyacrylic acid, polyamide, Nylon 6, Nylon 66, polyamides (PA), polybutylene terephthalate (PBT), polycarbonates (PC), polyetheretherketone (PEEK), polyetherketone (PEK), polyethylene terephthalate (PET), polyimide, polyoxymethylene plastic ("POM" or "Acetal"), polyphenylene sulfide (PPS), polyphenylene oxide (PPO), polysulphone (PSU), polytetrafluoroethylene ("PTFE"), poly(methyl methacrylate) (PMMA), natural rubber, isoprene rubber butadiene rubber, chloroprene rubber, silicone rubber, fluorosilicone rubber, polyurethane copolymer, isobutylene-isoprene rubber, styrene-butadiene rubber, acrylonitrile-butadiene rubber, acrylonitrile butadiene styrene (ABS), or hydrogenated nitrile butadiene rubber.

6. The magnetic polishing slurry according to claim 1, wherein the magnetic particles have an average particle size ranging from about 1.0 µm to about 5000 µm.

7. The magnetic polishing slurry according to claim 1, wherein the magnetic particles have an average particle size ranging from about 5.0 µm to about 100 µm.

8. The magnetic polishing slurry according to claim 1, wherein the modifying material coated over the magnetic particles has an average thickness of 1 to 100 nm.

9. The magnetic polishing slurry according to claim 1, wherein the corrosion inhibitor is an aromatic amine.

10. The magnetic polishing slurry according to claim 9, wherein the aromatic amine comprises a $C_{6-22}$ aromatic amine.

11. The magnetic polishing slurry according to claim 1, wherein the pH-adjusting agent is triethanolamine.

12. The magnetic polishing slurry according to claim 1, wherein the pH-adjusting agent is dimethylbenzylamine.

13. The magnetic polishing slurry according to claim 1, wherein the pH-adjusting agent is ethoxybenzylamine.

14. A magnetic polishing slurry for polishing a wafer, comprising:
    magnetic particles having a hardness lower than a hardness of the wafer, wherein the magnetic particles include europium, europium oxide, a europium alloy, an europium sulfate, an europium halide, an europium complex or combinations thereof, and wherein the magnetic particles have a particle size ranging from about 5.0 µm to about 5000 µm;
    a liquid carrier, which is an oily medium selected from mineral oil, vegetable oil, silicone oil, and combinations thereof; and
    abrasives selected from silicon oxide particles,
    wherein the magnetic polishing slurry further comprises a corrosion inhibitor selected from 1,2,4-triazole and derivatives thereof, 1,2,3-triazole and derivatives thereof, pyrazole and derivatives thereof, imidazole, benzimidazole and derivatives thereof, isocyanurate and derivatives thereof, and an aromatic amine.

15. The magnetic polishing slurry according to claim 14, wherein the slurry is substantially free of water.

16. A magnetic polishing slurry for polishing a wafer, comprising:
    magnetic particles coated with a modifying material, wherein a hardness of the modifying material is lower than a hardness of the wafer;
    a liquid carrier, which is an oily medium selected from mineral oil, vegetable oil, silicone oil, and combinations thereof;
    abrasives; and
    a corrosion inhibitor selected from the group consisting of: 1,2,4-triazole and derivatives thereof, 1,2,3-triazole and derivatives thereof, pyrazole and derivatives thereof, imidazole, benzimidazole and derivatives thereof, isocyanurate and derivatives thereof, an aromatic amine, and combinations thereof,
    wherein the magnetic particles comprise an alloy of cobalt comprising cobalt with an f-block transition element,
    wherein the modifying material comprises a polymer, and wherein the polymer comprises an elastomer.

17. The magnetic polishing slurry according to claim 16, wherein the alloy of cobalt comprising cobalt with the f-block transition element is selected from cobalt samarium alloy and cobalt neodymium alloy.

18. The magnetic polishing slurry according to claim 16, wherein the abrasives are selected from the group consisting of: silicon oxide particles, cerium oxide particles, and combination thereof.

19. The magnetic polishing slurry according to claim 16, wherein the abrasives are silicon oxide particles.

20. The magnetic polishing slurry according to claim 16, wherein the corrosion inhibitor is selected from an aromatic amine.

* * * * *